United States Patent
Patt-Shamir et al.

(10) Patent No.: US 7,586,892 B2
(45) Date of Patent: Sep. 8, 2009

(54) COMPUTER METHOD AND APPARATUS FOR PERIODIC SCHEDULING WITH JITTER-APPROXIMATION TRADEOFF

(75) Inventors: Boaz Patt-Shamir, Cambridge, MA (US); Zvika Brakerski, Kfar Saba (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

(21) Appl. No.: 10/832,487

(22) Filed: Apr. 26, 2004

(65) Prior Publication Data

US 2005/0237930 A1  Oct. 27, 2005

(51) Int. Cl.
*H04J 3/16* (2006.01)
*H04L 12/28* (2006.01)
*H04L 12/56* (2006.01)
*G06F 15/173* (2006.01)

(52) U.S. Cl. ............... 370/346; 370/395.32; 370/395.4; 709/201; 709/235

(58) Field of Classification Search .............. 370/395.4, 370/468, 408, 255, 256, 516, 254, 229, 230, 370/395.41
See application file for complete search history.

(56) References Cited

U.S. PATENT DOCUMENTS 6,034,960 A * 3/2000 Beshai et al. ............ 370/395.4
7,016,354 B2 * 3/2006 Vangal et al. ............... 370/392
2002/0093912 A1 * 7/2002 Gummalla et al. .......... 370/229
2003/0031141 A1 * 2/2003 Schweinhart et al. ....... 370/316
2003/0087649 A1 * 5/2003 Bhatia et al. ............... 455/456

OTHER PUBLICATIONS

Michael B. Jones, et al., "CPU Reservations and Time Constraints: Efficient, Predictable Scheduling of Independent Activities," http://research.microsoft.com/~mbj, pp. 1-14 (1997).
Swarup Acharya, et al., "Broadcast Disks: Data Management for Asymmetric Communication Environments," Brown University Dept. of Computer Science, Technical Report CS-94-43, pp. 1-26 (Oct. 1994).
C.L. Liu, et al., "Scheduling Algorithms for Multiprogramming in a Hard-Real-Time Environment," Association for Computing Machinery, Inc., pp. 1-15 (1973).
Sanjoy Baruah, et al., "Scheduling Periodic Task Systems to Minimize Output Jitter," Proceedings of the International Conference on Real-Time Computing Systems and Applications, pp. 62-69, Hong Kong, IEEE Computer Society Press (Dec. 1999).

* cited by examiner

*Primary Examiner*—Gregory B Sefcheck
*Assistant Examiner*—Salvador E Rivas (57) ABSTRACT

A method and apparatus of scheduling jobs each having respective (i) length of execution time and (ii) requested frequency of occurrence includes for each given job, allocation of a respective set of start times in a cycle in a manner that evenly spreads the given jobs over the cycle. Idle time slots are added or padded into the cycle in a manner which reduces jitter (i.e., the differences in spacing between consecutive occurrences of the same job). The method and apparatus enable a balance between period approximation and jitter reduction to be optimally achieved.

17 Claims, 6 Drawing Sheets

FIG. 1

Subroutine split 20

Input: A node $v$ with its set of associated job replicas.

Scan the job replicas associated with $v$ in increasing "$\prec$" order. Let j be the currently scanned replica, with period $\tau_j$ and size $b_j$ — 22

If $\tau_j < T$, add identical job replicas to both children of $v$, each with size $b_j$ and period $2\tau_j$ — 24

If $\tau_j = T$, add a job replica with period $\tau_j$ and size $b_j$ to the child of $v$ whose current total associated bandwidth (i.e., sum of the job replica lengths divided by their periods) is smaller. In case of a tie, add the replica to the left child. — 26

Output: Two sets of job replicas, associated with children of $v$.

COMPUTER METHOD AND APPARATUS FOR PERIODIC SCHEDULING WITH JITTER-APPROXIMATION TRADEOFF

BACKGROUND OF THE INVENTION

In broadcast disks (S. Acharya et al., "Broadcast disks: data management of asymmetric communication environments," in *Proc. ACM SIGACT/SIGMOD Symposium on Principles of Database Systems*, 1995), a powerful server broadcasts data items to mobile clients awaiting their desired items (e.g., public data like stock quotes, or user data like an address book). In an arbitrary broadcasting schedule, a client may have to "busy-wait" for its item, i.e., actively listen to the server until its item is broadcast, thus wasting much battery power. If the broadcast schedule is perfectly periodic, i.e., each item i is broadcast precisely every $p_i$ time units for some $p_i$, then the client can switch on its radio exactly when needed. However, an egalitarian round-robin schedule (which is perfectly periodic) is not satisfactory: a general solution must also accommodate for a different periodicity requirement for each item, since different items may have different popularity levels with clients, different expiration times, different QoS levels, etc.

Broadcast disks are just one example among many where it is desirable to have low jitter, namely the spacing between consecutive occurrences of the same item should be as equal as possible. Another example from the wireless world is the Sniff Mode in Bluetooth. In this case, slave devices can shut off their transceivers except for a certain time every once in a while, when they listen to find out whether the master device is trying to contact them. If the master uses a schedule with low jitter, it would help improving battery lifetime in the slave devices.

SUMMARY OF THE INVENTION

The present invention provides a system, method and apparatus to address the problems of the prior art in providing both jitter reduction and relatively increased period approximation in periodic scheduling.

In one embodiment there is a method and apparatus for scheduling jobs each having respective (i) length of execution time and (ii) requested frequency of occurrence (i.e., period) comprising computer implemented steps of:

for each given job, allocating a respective set of start times in a cycle in a manner that evenly spreads the given jobs over the cycle; and adding idle time slots in the cycle in a manner which reduces jitter (i.e., the differences in spacing between consecutive occurrences of the same job). The allocating and adding are performed in a manner that provides a balance between period approximation and jitter reduction.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Consider an asymmetric wireless communication setting, where a server periodically broadcasts data items to different mobile clients. The goal is to serve items in a prescribed rate, while minimizing the energy consumption of the mobile users. Abstractly, the present invention is concerned with or presented with a set of jobs, each with a known execution time and a requested period, and the task is to design a schedule for these jobs over a single shared resource without preemption. Given any solution schedule, its period approximation is the maximal factor by which the average period of a job in the schedule is blown up with respect to its requested period, and the jitter ratio is roughly the maximal variability of times between two consecutive occurrences of the same job. Schedules with low jitter ratio allow the mobile devices to save power by having their receivers switched off longer. In the present invention, applicants consider a scenario where clients may be willing to settle for non-optimal period approximation so that the jitter ratio is improved. Applicants present a parametric jitter-approximation tradeoff system that allows one to choose various combinations between jitter optimality and period optimality for any given set of jobs.

An "instance" of the problem consists of a set of "jobs", where each job has known "length" and "requested period". The task is to design a single-server non-preemptive periodic schedule of the jobs, i.e., each job is assigned an infinite sequence of occurrence times such that no two distinct occurrences of any two jobs overlap. The "granted period" of a job in a schedule is the average time between two consecutive occurrences of that job. Jitter is defined as follows. Consider the set of all interval lengths between each consecutive occurrence of a job. (The average of these lengths is the granted period of the job.) The "jitter ratio" of that job is the maximal difference between such an interval length and the granted period, normalized by dividing that difference by the granted period. In this work, applicants evaluate a schedule by its worst case period approximation and its worst-case jitter ratio over all jobs. One would like the schedule to have the smallest possible period approximation (1 means that each granted period is no larger than the corresponding requested period), and the smallest possible jitter ration (0 is a trivial lower bound that holds if and only if the schedule is perfectly periodic).

Constructing schedules with period approximation 1 is a well-studied problem, starting with the seminal work of Liu and Layland (Liu, C. L. and J. W. Layland, "Scheduling algorithms for multiprogramming in a hard-real-time environment," *J ACM*, 20(1):46-61, January 1973). Unfortunately, there are cases where insisting on period approximation 1 implies that the jitter ratio can be as high as 1, i.e., the job can occur at any time, which means in the wireless context that the receivers might need to stay powered all the time. On the other extreme, there are a few algorithms that construct perfectly-periodic approximation 1. As a quick example to that effect, consider an instance that contains two jobs (among others), each of unit length, such that one job requests period 2 and the other requests period 3. By the Chinese Remainder Theorem, any schedule with these periods will have these two jobs collide every 6 time slots, and hence it cannot be the case that the jitter ratio is 0 and the period approximation is 1 simultaneously.

In the present invention, applicants try to win (most of) the good of both worlds by developing a system that allows one to trade and/or balance jitter ratio and period approximation. In one embodiment, the system invention receives as input an instance and a parameter that specifies the maximal allowed jitter ratio; the system then outputs a periodic schedule for this instance that (1) satisfies the jitter ratio parameter, and (2) has period approximation guaranteed better than the best previously known bounds.

Motivated by operating systems and other centralized scheduling scenarios, most previous work about periodic scheduling took the viewpoint that period approximation must not be larger than 1, and jitter is only of secondary importance. For example Liu and Layland define periodic scheduling to be one where a job with period $\tau$ is scheduled exactly once in each time interval of the form $[(k-1)\tau, k\tau-1]$ for any integer k. Naively interpreted, this definition allows a jitter ratio as high as 1, which is not useful. Baruah et al. (Baruah, S. et al., "Scheduling periodic task systems to minimize output jitter," in *International Conference on Real-Time Computing Systems and Applications*, IEEE Computer Society Press, pp. 62-69, Hong Kong, December 1999) still insist on keeping the period approximation 1 but try to minimize jitter. They define a generalized concept of jitter, prove bounds on the jitter ratio in terms of the specific instance at hand, and propose algorithms that search for schedules with minimal jitter under this restriction. In the present invention, applicants use a special case of Baruah et al. definition (Baruah et al. allow arbitrarily weighted jitter). Cast into applicants' language, the Baruah et al. jitter bound is as follows. Let $\beta_i$ denote the bandwidth request of job i, defined to be the job length of i divided by its period, and let $\beta=\Sigma_i \beta_i$ over all jobs i in the instance. Then the jitter ratio of a job i is at most $1-(\beta-\beta_i)$.

General perfectly periodic schedules are defined and analyzed in Brakerski (Brakerski, Z. et al., "General perfectly periodic scheduling," in *Proc. 21st Ann. ACM Symp. on Principles of Distributed Computing*, pp. 163-172, July 2002), where the concept of the extent of an instance is defined. Formally, the extent of an instance, denoted R, is the ratio between the maximal job length and the shortest job period. It is proved that any perfectly periodic schedule has period approximation at least 1+R, and an algorithm with approximation ratio $1+O(R^{1/3})$ is presented (note that R<1, so $R^{1/3}>R$). Naaman and Rom (Naaman, N. and R. Rom, "Scheduling real-time constant bit rate flows over a TDMA channel," Technical Report CCIT 410, Dept. of Electrical Engineering, Technion, December 2002) study the case where the ratio between periods of jobs is always an integer. They give an algorithm to generate schedules with period approximation 1 and jitter ratio (k-1)R, where k is the number of distinct requested periods and R is the extent of the instance. They show that this bound is tight for period approximation 1.

In the present invention, given any instance of periodic scheduling, and an integer parameter g, a schedule with period approximation less than $$1 + \frac{\sqrt{2}}{2} + R/2^{g-1} \approx 1.707 + R/2^{g-1}$$

and jitter ratio at most $R_g$ is produced. The parameter g must be non-negative and cannot be larger than $$\log_2 \frac{T}{t},$$

where T and t are the largest and smallest requested periods, respectively. Incidentally, this algorithm, when applied with g=0, improves on the best known results for perfectly periodic schedules for R>0.006. The present invention is formed of two parts. The first part involves a computer routine or Algorithm cont_bal that guarantees an approximation ratio of $1+R/2^g$ and a jitter ratio of Rg. However, this algorithm applies only to instances in which the ratio of any two periods is a power of 2. Using Algorithm cont_bal as a subroutine, the second part provides a final solution which applies to any instance.

The formal model is presented next.

Most of the notation used in this work is summarized in Table I.

Instances. An instance of the perfectly-periodic scheduling problem is a set of n jobs $J=\{j_i\}_{i=1}^n$, where each job $j_i=(b_i, \tau_i)$ has length (or execution time) $b_i$, and requested period $\tau_i$. Applicants sometimes refer to jobs also as clients. The maximal length of a job in an instance J is denoted by $$B_J \overset{def}{=} \max\{b_i \mid i \in J\}.$$

The maximal and minimal values of the requested periods in instance J are denoted by $$T_J \overset{def}{=} \max\{\tau_i \mid j_i \in J\}, \text{ and } t_J \overset{def}{=} \min\{\tau_i \mid j_i \in J\}.$$

The ratio between $B_J$ and $t_J$ is called the extent of J, formally defined by $$R_J \overset{def}{=} \frac{B_J}{t_J}.$$

The requested bandwidth of job $j_i$ is defined by $$\beta_i \overset{def}{=} \frac{b_i}{\tau_i}.$$

The total bandwidth of instance J is defined by $$\beta_J \overset{def}{=} \sum_{i=1}^n \beta_i.$$

Applicants assume that $\beta_J \geq 1$ always. The free bandwidth of an instance J is defined by $$\Delta_J \stackrel{def}{=} 1 - \beta_J.$$

Applicants omit the subscript J when the instance is clear from the context.

Schedules. A schedule S for an instance J is an infinite sequence of start times $s_0, s_1, s_2, \ldots$, where each start time $s_k$ is mapped to a job $j(k) \in J$. Applicants say that job $j(k)$ is scheduled at the time slots $s_k, s_k+1, \ldots, s_k+b_{j(k)}-1$. A schedule is feasible only if no two jobs are ever scheduled at the same time step, i.e., for all $k \geq 0$, $s_{k+1} \geq s_k + b_{j(k)}$. A schedule is cyclic if it is an infinite concatenation of a finite schedule C, called the "cycle of S". In this application, applicants consider only cyclic schedules.

Fix a feasible schedule S for an instance J, and let C be the cycle of S. Assume without loss of generality that each job of J is scheduled at least once in C. The granted period of a job is $j_i$ in S, denoted $\tau_i^S$, is the number of time slots in C divided by the number of start times of $j_i$ in C. Note that the granted periods may be different from the requested periods, but the job lengths cannot be truncated by the schedule.

Given an instance J with schedule S, the period approximation of a job $j_i$ in S is $$\rho_i \stackrel{def}{=} \frac{\tau_i^S}{\tau_i}.$$

The period approximation of S with respect to J is $$\rho(J, S) \stackrel{def}{=} \max\{\rho_i \mid i \in J\}.$$

To define jitter, let $s_1, s_2, \ldots$ be the start times of a job $j_i$ in S, and let $\tau_i^s$ be its average period. The jitter ratio of $j_i$ in S is $$\sigma_i \stackrel{def}{=} \max_k \left\{ \frac{|(s_{k+1} - s_k) - \tau_i^S|}{\tau_i^S} \right\},$$

and the jitter ratio of S is $$\sigma_j(S) \stackrel{def}{=} \max_i \{\sigma_i \mid j_i \in J\}.$$

All logarithms in this disclosure are to base 2.

Next is presented applicants' basic controlled balance computer routine/algorithm for periodic scheduling with controllable jitter, which works only when the ratio between any two periods is a power of two. The idea in the control balance routine/algorithm is to spread the jobs evenly over the schedule in a recursive fashion. The algorithm also adds idle time slots, at a level specified by the user, so as to reduce the jitter caused by possibly imperfect balancing. The algorithm is based on a known algorithm used for perfectly periodic schedules (Brakerski, Z. et al., "General perfectly periodic scheduling", in *Proc. 21st Ann. ACM Symp. on Principles of Distributed Computing*, pp. 163-172, July 2002), but augmented here with a way to control jitter by adding idle time slots. An algorithm similar to the one of Brakerski et al. appears in Jones, M. B. et al., "CPU reservations and time constraints: Efficient, predictable scheduling of independent activities," in *6th ACM Symposium on Operating Systems Principles (SOSP)*, pp. 198-211, October 1997, for general periodic scheduling; it is described as a heuristic without analysis, and without the controlled jitter idea.

The present invention controlled balance routine is given an integer parameter g such that $$0 \leq g \leq \log \frac{T}{t}$$

(recall that T is the longest requested period, t is the shortest requested period, and that their ratio is a power of 2). This parameter controls the tradeoff between jitter and approximation: setting g=0 will result with a perfectly periodic schedule and poor approximation guarantee, and increasing g results in better approximation and poorer smoothness. For convenience, applicants also use the complementary parameter $$h \stackrel{def}{=} \log \frac{T}{t} - g.$$

Figure 1:
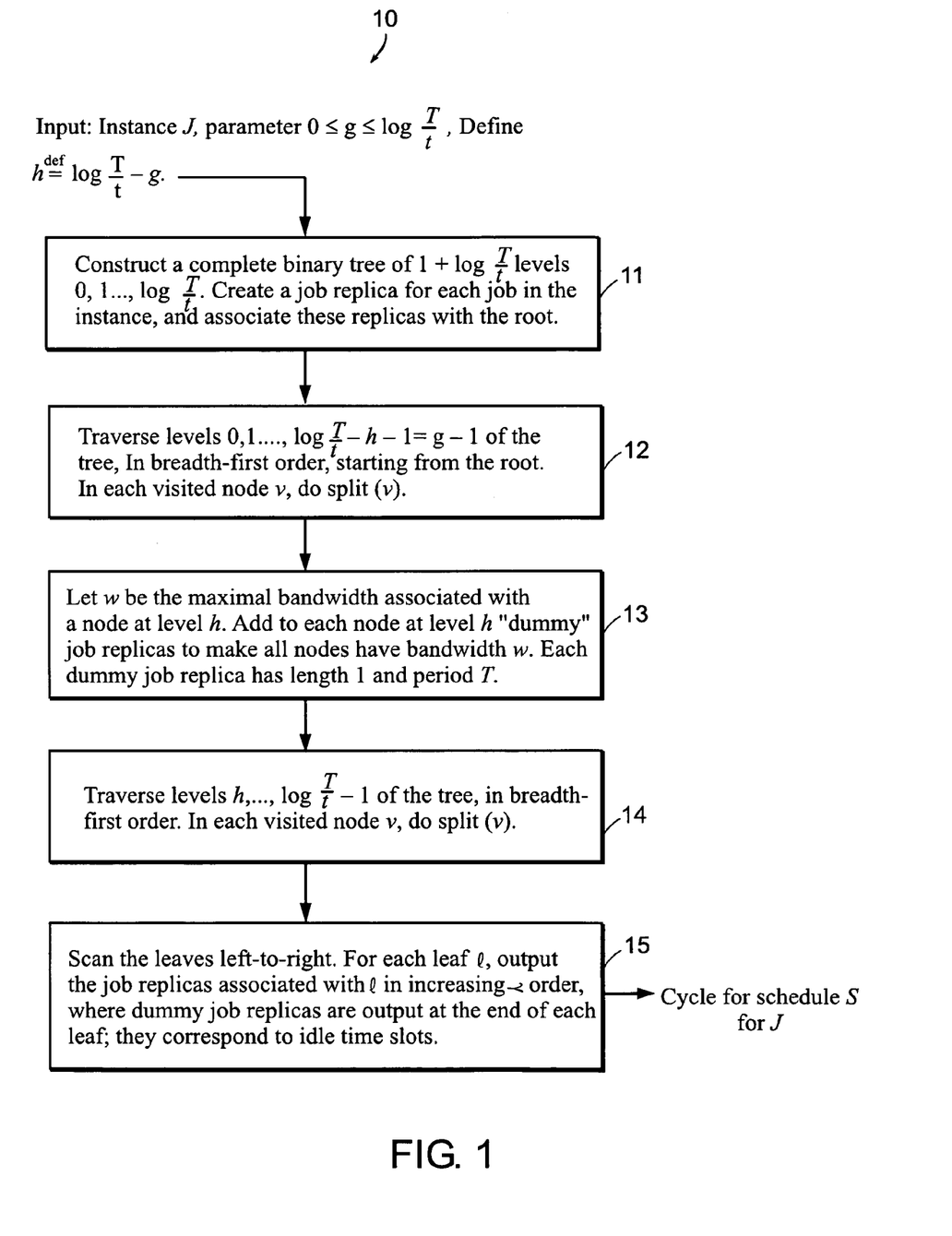
FIG. 1 is a flow diagram of a control balance routine in one embodiment of the present invention.
Figure 3:
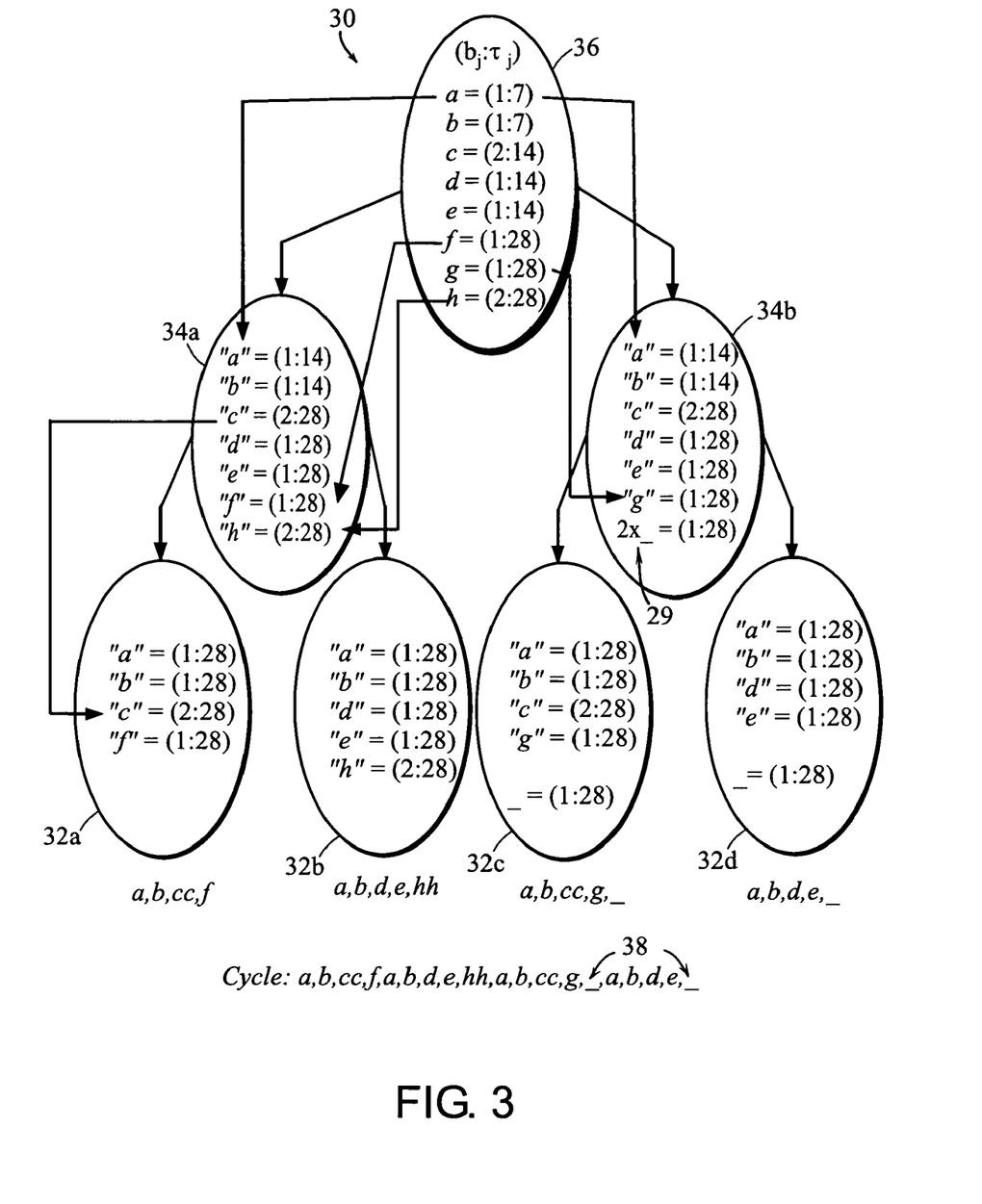
FIG. 3 is a schematic view during execution of the invention routines of FIGS. 1 and 2.

Pseudo code for the algorithm (i.e., invention control balance process or routine) 10 is presented in FIG. 1 and an example execution is depicted in FIG. 3. The invention routine/algorithm 10 constructs a cycle of the schedule by allocating start times in a balanced way. This is done using a binary tree 30 (FIG. 3) of $$1 + \log \frac{T}{t}$$

levels, whose leaves 32a, b, c, d, represent sub-intervals of the schedule cycle. Each node 34 in the tree contains "job replicas" derived from the original instance, where each job replica has its own associated period.

As shown in FIG. 3, the root node 36 represents the original instance and has jobs a through h. Each job is parenthetically indicated with a respective size or length $b_j$ and period $\tau_j$ (separated by a colon). Thus "job a" has size 1 time-interval and requested frequency (period) of 7 time intervals. "Job c" has size 2 intervals and requested period of 14. The longest requested period of the original jobs shown in root node 36 is T=28, and the shortest is t =7. Binary Tree 30 is 3 levels $$3 \text{ levels} \left( = 1 + \log \frac{T}{t} = 1 + \log \frac{28}{7} = 1 + \log 4 \right)$$

where root node 36 forms level 1, nodes 34 form level 2 and leaf nodes 32 form level 3.

The tree 30 is constructed in a top-down fashion as follows. Initially, the root 36 contains all job replicas that are exactly the jobs in the instance (Step 11). Each node is formed of two children, whose replicas are defined by subroutine split (Steps 12 and 14). Pseudo-code for the split subroutine 20 appears in FIG. 2. To ensure low jitter, split 20 uses a total order on jobs, "≺", defined below. This order ensures that at any given level, for any given job j, all nodes 34, 32 in which a job replica associated with j occurs have the same set of job replicas preceding it. Put differently, a job has the same offset within a node 34, 32 for all its replicas at a level.

Figure 2:
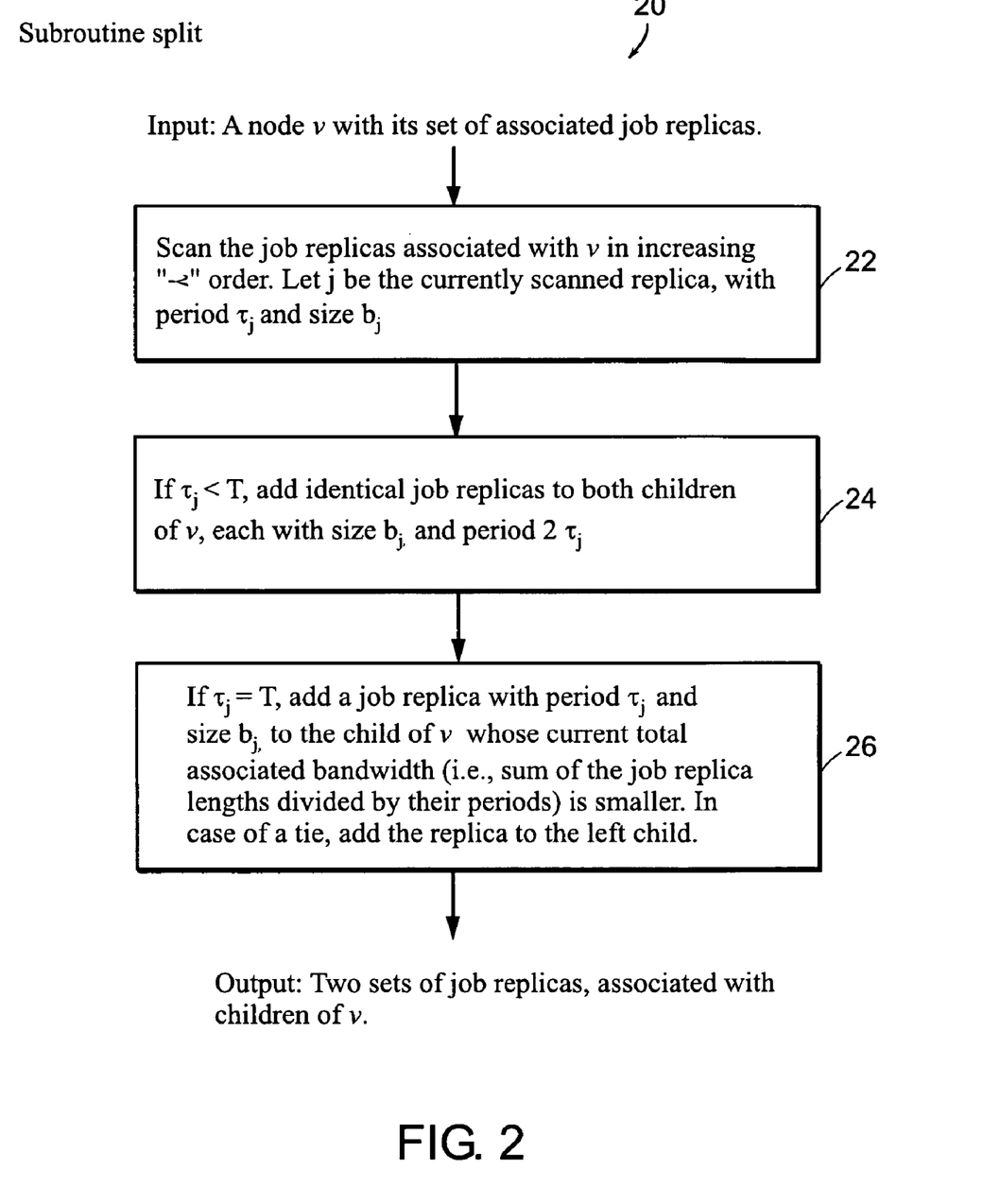
FIG. 2 is a flow diagram of a split subroutine in the control balance routine of FIG. 1.

With reference to FIG. 2, the split subroutine 20 receives on input a node 36, 34 from tree 30 (FIG. 3). Take root node 36 for example. At step 22, subroutine split 20, scans "job a " through "job h" in the order listed in root 36 of FIG. 3 which is increasing $\prec$ order. That is, job a and job beach have period $\tau=7$ which is less than $\tau=14$ of jobs c,d and e. Thus jobs a and b are ordered before jobs c, d and e. Similarily, jobs f, g, and h are ordered last with the largest of $\tau=28$. Between job a and b, each is ordered basically sequentially (a before b) relative to the other. Likewise among jobs c, d and e, sequential ordering provides job c before job d before job e; and so on.

At step 24 of subroutine 20, the period ($\tau=7$) of job a is compared to T=28 the largest requested period of all instance jobs in root node 36. Since the period of job a is smaller than T, then a replica of job a is added to each child node 34 of root 36. The straight line arrows in FIG. 3 are illustrative. The replicas of job a are indicated with quotes (e.g. "a") and have a period doubled that of the original period (so replica job a $\tau=14=2\times7$). Size b remains the same (at 1).

Step 24 is repeated for jobs b, c, d and e. The resulting replica jobs "b", "c", "d" and "e" are illustrated in nodes 34a and 34b of FIG. 3. Straight line arrow indications are omitted here and in lower nodes 34 to 32 for simplicity of illustration. Each replica job has a size b equal to its respective original job size shown in root node 36 and a period $\tau$ twice that of the respective original period.

Next, job f is processed. The period ($\tau=28$) of job f is compared to T=28. Since the period of job f is equal to T, then step 26 applies. In step 26, a replica of job f is added to only one of the child nodes 34 of root 36. The left most child node 34a is selected because the current associated bandwidth $$\left(= \frac{1}{14} + \frac{1}{14} + \frac{2}{28} + \frac{1}{28} + \frac{1}{28}\right)$$

of node 34a is less than or equal to that $$\left(\frac{1}{14} + \frac{1}{14} + \frac{2}{28} + \frac{1}{28} + \frac{1}{28}\right)$$

of node 34b. Replica job f has the same size (b=1) and period ($\tau=28$) of its corresponding original job in root node 36.

Step 26 is repeated for jobs g and h as illustrated by straight line arrows in FIG. 3. Child node 34a as shown in FIG. 3 results, and child node 34b minus the dummy job replica 29 (described next) results.

Returning to routine 10 of FIG. 1, after the split subroutine 20 at step 12, process continues at step 13. In step 13, nodes at level h are padded with "dummy" job replicas 29 so that all nodes at level h have exactly the same length.

Thus in the example of FIG. 3, node 34a is found to have the greatest bandwidth in the second level. The bandwidth is the sum of the quotients of size $b_j$ over period $\tau_j$, of each job in node 34a. Or $$\frac{1}{14} + \frac{1}{14} + \frac{2}{28} + \frac{1}{28} + \frac{1}{28} + \frac{1}{28} + \frac{2}{28} = \frac{11}{28} = w.$$

So node 34b is padded with dummy job replica 29 in a manner that increases its bandwidth to equal that of node 34a and in a manner so that nodes 34 have the same length. Each dummy job replica has size (length) 1 and period $\tau=T$ (=28 in this example).

In step 14 of FIG. 1, the split subroutine 20 is applied to certain remaining levels of tree 30. Continuing with the same example, nodes 34a and 34b are input to subroutine 20 and the illustrated leaf nodes 32a, b, c, d result. It is noted that the dummy job replicas in nodes 32c and 32d are produced by the split subroutine 20 applied to the dummy job replica 29 in node 34b.

Finally in routine 10 (FIG. 1), the leaves 32 are scanned and their associated replicas are output (Step 15). The dummy replicas 29 correspond to idle time slots 38. The consequence of the padding at level h is that the leaf lengths are roughly the same.

The $\prec$ order is defined as follows. For jobs $j_i$, $j_k$ with requested periods $\tau_i$ and $\tau_k$ respectively, applicants say that $j_i \prec j_k$ if either $\tau_i < \tau_k$, or if $\tau_i = \tau_k$ and i<k. Applicants stress that the "$\prec$"relation is defined on jobs, not job replicas. To extend the order to replicas, each job-replica uses the rank it inherits from its original job (even though a replica has a possibly different period).

The main properties of Algorithm cont_bal (invention routine 10) are summarized in the following theorem.

Theorem 3.1. Let $j=\{j_i=(b_i:\tau_i)\}_{i=1}^n$ be an instance with extent R. Suppose that there exists a constant c>0 such that for all i, $\tau_i,=c\cdot 2^{e_i}$ where $e_1, \ldots, e_n$ are non-negative integers. Then Algorithm cont_bal with parameter g outputs a schedule S with $\rho(J,S) \leq 1+R/2^g$ and $\sigma(S) \geq Rg$.

The theorem follows directly from Lemma 3.3 and Lemma 3.6 proved below. But first, note that the tradeoff between jitter and approximation is controlled by the value of g: a small value of g means better jitter and worse approximation. The extreme points are g=0 (jitter ration 0 and period approximation 1+R), and $$g = \log\frac{T}{t} \text{ (period approximation 1 and jitter ratio } R \log\frac{T}{t}\text{)}.$$

Lemma 3.2 The bandwidth associated by Algorithm cont_bal with each node at level i is at most $2^{-i}(1-\Delta)+(1-2^{-i})$ B/T.

Proof. Applicants prove the claim by induction on i. For i=0 the claim is trivial: the bandwidth associated with the root is 1−Δ by Step 11 of routine cont_bal 10. Consider a node at level i+1, and let $\beta_1$ denote its bandwidth. Let $\beta_0$ denote the bandwidth of its parent at level i, and let $\beta_2$ denote the bandwidth of its sibling. By induction hypothesis, $\beta_0 \geq 2^{-i}(1-\Delta)+(1-2^{-i})B/T$. By the code of subroutine split 20 (FIG. 2), the difference between the bandwidth associated with any two siblings is at most the bandwidth of one job replica whose period is T. Since the size of any job replica is at most B, we get $|\beta_1-\beta_2| \leq B/T$. Assume without loss of generality that $\beta_1 \geq \beta_2$. Then we have that $$\beta_1 \leq \frac{\beta_0 + B/T}{2} \leq \frac{1}{2}(2^{-i}(1-\Delta)+(1-2^{-i})B/T + B/T) =$$

$$2^{-i-1}(1-\Delta)+(1-2^{-i-1})B/T$$

proving the inductive step for Step 12. Step 13 does not increase the maximal bandwidth associated with nodes at level h, the induction hypothesis is not violated for i=h, and hence the lemma holds also for Step 14.

Using Lemma 3.2, applicants bound below the period approximation. The result is in fact sharper than the bound stated in Theorem 3.1.

Lemma 3.3. The period approximation of a schedule produced by cont_bal routine 10 with parameter g is at most $$1-\Delta+R/2^g-B/T.$$

Proof. Consider a job $j_i$ with requested period $\tau_i=T/2^{e_i}$ for some integer $e_i \geq 0$. The average granted period of $j_i$ is its number of occurrences in a cycle of the schedule, divided by the length of the cycle. The number of start times of $j_i$ in the output cycle is clearly $2^{e_i}$, because in the final schedule, the number of start times is the number of job replicas corresponding to $j_i$ in the leaves, and because all job replicas in the leaves have period T. It remains to bound the number of time slots in the output cycle. This is precisely the sum of the lengths of job replicas in the leaves, which, in turn, is T times the total bandwidth associated with the leaves. Now, the total bandwidth of leaves is the same as the total bandwidth of all nodes at level h, because no new bandwidth is added after Step 13. By Lemma 3.2, the bandwidth associated with each node at level h after Step 13 is at most $2^{-h}(1-\Delta)+(1-2^{-h})$B/T. Multiplying by $2^h$ (the number of nodes at level h) one gets a bound on the total bandwidth at the leaves, and further multiplying by T one gets a bound on the number of time slots in the output schedule. As a result, the output cycle contains at most $T(1-\Delta)+(2^h-1)$B time slots. It therefore follows that the average period of $j_i$ in the schedule is $2^{e_i}(T(1-\Delta)+(2^h-1)$B$)$. Recalling that the requested period is $T/2^{e_i}$, and since $j_i$ is an arbitrary job, the approximation factor of the schedule is at most $$\frac{\frac{T(1-\Delta)+(2^h-1)B}{2^{e_i}}}{T2^{-e_i}} = 1-\Delta+(2^h-1)B/T$$
$$= 1-\Delta+\left(\frac{T}{t2^g}-1\right)\frac{B}{T}$$
$$= 1-\Delta+2^{-g}R-\frac{B}{T}$$

Lemma 3.3 shows that it may be the case that the period approximation is actually smaller than 1 (i.e., all jobs get larger share than they asked for). This happens when $\Delta > R/2^g$, i.e., when there is a lot of free bandwidth in J. If this is undesirable, applicants can scale up the all periods by a factor of $1-\Delta+2^{-g}R$ and apply the algorithm to the scaled instance. Note that the jitter bound would actually decrease in this case by the scaling factor, since t will grow by that factor and B remains fixed.

To analyze the jitter of the schedules produced by cont_bal routine 10, note the following.

Lemma 3.4. Consider the set of job replicas associated with each node as a list sorted in increasing $\prec$ order. Suppose that two job replicas j', j" of the same job j are associated with two nodes v', v" in the same level. Then the same job replicas precede j' in the ordered list of v' and precede j" in v".

Proof. Focus on a single split operation. There are two cases to consider. If a job replica j' at the parent appears at both children as j' and j", then the period of j (at the parent) is smaller than T. In this case, by definition of $\prec$, all jobs preceding j at the parent also have periods smaller than T, and hence they will appear at both children, preceding both j' and j". In the second case, j has period T at the parent, and hence it will appear in only one child. In this case, the identity of the child and j's rank in that child's sorted list depend only on the job replicas preceding j in the parent's list. Applying induction completes the proof.

Lemma 3.5. Let $W_h$ be the bandwidth associated with nodes at level h after Step 13. Then for any $0 \leq i \leq g$, the bandwidth associated with any node at level h+i is at least $2^{-i}W_h-(1-2^{-i})$B/T and at most $2^{-i}W_h+(1-2^{-i})$B/T.

Proof. The upper bound is just a restatement of Lemma 3.2. The proof of the lower bound is repeating the arguments of the proof of Lemma 3.2, with the basis of the induction replaced by the fact that all nodes at level h have the same bandwidth after Step 13.

Lemma 3.6 The jitter ratio is the schedule produced by cont_bal routine 10 with parameter g at most $R_g$.

Proof: Consider a job $j_i$ with period $\tau_i=T/2^{e_i}$ for some integer $e_i \geq 0$. By the algorithm, there will be a job replica in each node of level $e_i$, with associated period T. By Lemma 3.4, the list of job replicas preceding the job replicas of $j_i$ is the same in all these nodes. Consider now the subtrees rooted at the nodes at level $e_i$. Clearly, exactly one job replica will appear in the leaves of each sub-tree. Number the leaves of the subtrees by $0, 1, \ldots, 2^{e_i}-1$ from left to right. Since the allocation of a job replica to a child depends, by sub-routine split 20, only on the jobs preceding it in the $\prec$ order, applicants conclude that a job replica of $j_i$ will be placed in leaf number k in any subtree if and only if it is placed in leaf number k in all subtrees. Moreover, by Lemma 3.4, the set of job replicas preceding $j_i$ in each leaf will be the same. It follows that the variability in the time between consecutive occurrences of j can be caused by leaves of different sizes. So consider the start time of a leaf. Applicants claim that the start time of leaf number k is at least $kT2^{-g}W_h-gB$ and at most $kT2^{-g}W_h+gB$ time units after the start of a subtree rooted at a node at level $e_i$, where $W_h$ is the bandwidth of nodes at level h. To see why this is true, note that the start time of leaf k is exactly the sum of the bandwidths of leaves $0, \ldots, k-1$ times T. Consider the path from the root to leaf k: this path contains nodes which are left and right children. The key observation is that the total bandwidth of leaves preceding k is exactly the sum of bandwidths of nodes which are the left siblings of right-children nodes in the path leading to k. By construction, the total bandwidth of a tree rooted at level $i \leq h$ is $2^{h-i}W_h$. By Lemma 3.5, the total bandwidth of a tree rooted at level $i>h$ is at least $2^{h-i}W_h-B/T$ and at most $2^{h-i}W_g+B/T$. Since there are at most g nodes which are right children on the path leading to k, applicants get that the maximal time between two consecutive occurrences of $j_i$ is $\tau_i+Bg$, and the minimal time between two consecutive occurrences of $j_i$ is $\tau_i-Bg$. Hence $\sigma_i \leq Bg/\tau \leq Rg$.

Algorithm cont_bal requires that the ratio between any two periods to be a power of 2. In this section, applicants lift this restriction and consider general instances.

One straightforward way to do that is to round all requested periods up to the next power of 2. This immediately gives, for instances whose requested bandwidth is at most 1, a guaranteed period approximation at most $2+R/2^{g-1}$ and jitter ratio of at most Rg. However, more judicious rounding allows one to obtain substantially better period approximation, and even to break the barrier of 2 for instances with small extent. Specifically, in this section applicants present a system (an algorithm) that guarantees, for any instance, period approximation less than $1.71+R/2^{g-1}$ and jitter ratio at most Rg. Moreover, this approximation is obtained using only powers of 2 times a common multiple as periods in the final schedule.

Figure 4:
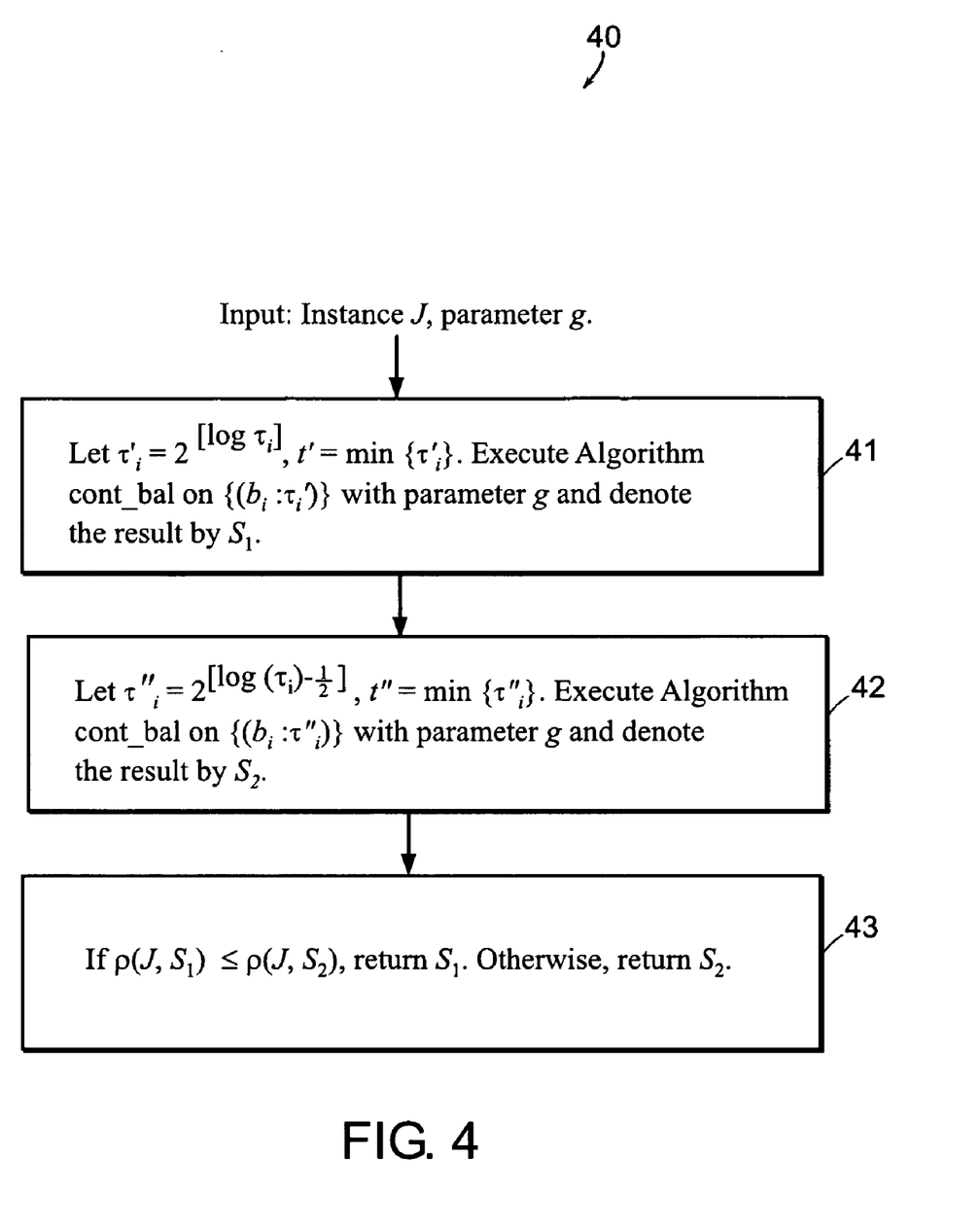
FIG. 4 is a flow diagram of a preferred embodiment.

The invention system/routine 40 referred to as Algorithm B is presented in FIG. 4. The idea is as follows. The system tries two forms of rounding. The first (Step 41) is to round up each period $\tau_i$ to the next power of 2, and the second (Step 42) is to round each period $\tau_i$ to the closest power of 2. Periods between $2^{k-1/2}$ and $2^{k+1/2}$ are rounded to $2^k$. Algorithm cont_bal 10 is applied to both rounded instances, and the schedule with the better period approximation of the two alternatives is the final output (Step 43). That is, the alternative schedule with relative optimal period approximation is selected. Below, it is shown that at least one of the two schedules has period approximation not larger than $$1 + \frac{\sqrt{2}}{2} + R/2^{g-1} \approx 1.707 + R/2^{-1}.$$

Theorem 4.1. Let $J=\{j_i=(b_i:\tau_i)\}_{i=1}^n$ be an instance of the scheduling problem with requested bandwidth at most 1, and let S be the schedule produced for J by Algorithm B with parameter g. Then $$\rho(J, S) \leq 1 + \frac{\sqrt{2}}{2} + R/2^{g-1}$$

and $\sigma(S) \leq Rg$.

Proof. Consider Step 1. Denote the bandwidth of the rounded instance $\{j_i=(b_i:\tau_i')\}_{i=1}^n$ by $\beta'$, its extent by R', and its free bandwidth by $\Delta'=1-\beta'$. Proceed by case analysis, depending on the relation between $\Delta'$ and a certain threshold parameter $\delta_0$ whose value will be specified later.

Intuitively, the idea is as follows. If $\Delta' \geq \delta_0$, one has a lot of free bandwidth, and hence $S_1$ will have a good period approximation. If $\Delta' \leq \delta_0$, i.e., there is "little" free bandwidth, then it must be the case that only a small fraction of the bandwidth is associated with jobs whose periods were rounded up by more than $\sqrt{2}$. Therefore, one can afford to round the periods of these jobs down, thus getting an instance where no period was rounded up by much, and $S_2$ will have a good period approximation.

Formally, applicants argue as follows.

Case 1: $\Delta' \geq \delta_0$. Consider the application of Algorithm cont_bal to the rounded instance $\{(b_i:\tau_i')\}$. By Theorem 3.1, the algorithm gives a period approximation of at most $1-\Delta'+2^{-g} R' \leq 1-\delta_0+2^{-g}R$. Since the rounding changes the periods in $S_1$ by a factor of less than 2, applicants can conclude that in this case, $$\rho(J,S_1) \leq 2-2\delta_0+2^{1-g}R. \qquad (1)$$

The jitter ratio in this case is $R'g \leq Rg$.

Case 2. $\Delta' < \delta_0$. In this case applicants concentrate on $S_2$. Denote the bandwidth and the extent of the instance produced by the rounding of Step 42 by $\beta''$ and $R''$, respectively. Consider the rounding first. By the code, one has that for all i, $$\frac{1}{\sqrt{2}} \leq \frac{\tau_i^*}{\tau_i} \leq \sqrt{2}. \qquad (2)$$

It follows from Eq. (2) that the rounding of Step 42 contributes a factor of at most $\sqrt{2}$ to the period approximation of $S_2$. By theorem 3.1, the application of Algorithm cont_bal in Step 42 increases the period approximation of $S_2$ by at most another factor of $\beta''+R''$. It is immediate from Eq. (2) that $R'' \leq \sqrt{2} R$. Now bound $\beta''$.

Partition the set of jobs into two subsets, $G_1$ and $G_2$ such that $$G_1 = \{i | \log \tau_i - \lfloor \log \tau_i \rfloor \leq 1/2\}.$$

$$G_2 = \{i | \log \tau_i - \lfloor \log \tau_i \rfloor > 1/2\}.$$

I.e., $G_1$ consists of all jobs whose periods were rounded down in Step 42, and $G_2$ consists of all jobs whose periods were rounded up in Step 42. Denote the total requested bandwidths of $G_1$ and $G_2$ by $\beta_1$, $\beta_2$ respectively. Start by bounding $\beta''$ in terms of $\beta_1$: this is based on the observation that in the rounding step, the bandwidth of jobs in $\beta_1$ may increase by a factor of at most $\sqrt{2}$, and the bandwidth of jobs in $G_2$ does not increase. Adding the fact that $\beta_2 \leq 1-\beta_1$, one gets $$\beta'' \leq \sqrt{2}\beta_1 + \beta_2$$

$$\leq \sqrt{2}\beta_1 + (1-\beta_1) = 1 + (\sqrt{2}-1)\beta_1 \qquad (3)$$

Next, bound $\beta_1$ in terms of $\beta'$. Recall that $\beta_1$ is defined by the rounding of Step 41. In that rounding, the periods of jobs in $G_1$ are increased by a factor of at least $\sqrt{2}$, and the periods of jobs in $G_2$ are not decreased. Hence $\beta' \leq \beta_1/\sqrt{2}+\beta_2$. Since in this case, $\Delta' < \delta_0$, i.e., $1-\beta' < \delta_0$, applicants can conclude that $$\delta_0 > 1 - \beta' \geq 1 - \left(\frac{\beta_1}{\sqrt{2}} + \beta_2\right) \geq 1 - \left(\frac{\beta_1}{\sqrt{2}} + (1-\beta_1)\right) = \qquad (4)$$

$$\left(1 - \frac{1}{\sqrt{2}}\right)\beta_1.$$

Rearranging, one gets $$\beta_1 < \frac{\sqrt{2}\,\delta_0}{\sqrt{2}-1}$$

Combining Eqs. (3, 4) with the observations above, one obtains a bound on the approximation ratio of $S_2$ in this case:

$$\rho(J, S_2) \leq \sqrt{2}\,(\beta'' + 2^{-g}R'') \leq \sqrt{2}\,(1+(\sqrt{2}-1)\beta_1 + 2^{1/2-g}R) < \qquad (5)$$

$$\sqrt{2}\left(1+(\sqrt{2}-1)\cdot\frac{\sqrt{2}\,\delta_0}{\sqrt{2}-1} + 2^{1/2-g}R\right) = \sqrt{2} + 2\delta_0 + 2^{1-g}R.$$

The proofs can now be concluded, using the bounds of Eq. (1) and Eq. (5).

$$\rho(J,S) \leq \max(\rho(J,S_1),\rho(J,S_2)) \leq$$

$$\leq \max(2-2\delta_0+R2^{1-g}, \sqrt{2}+2\delta_0+R2^{1-g}) \qquad (6)$$

The maximum in Eq. (6) is minimized when the two expressions of Eq. (6) are equal; equality is obtained when $$\delta_0 = \frac{1}{2} - \frac{1}{2\sqrt{2}}$$

yielding $$\rho(J, S) \leq 1 + \frac{\sqrt{2}}{2} + 2^{1-g}R.$$

The jitter ratio in this case is Rg as well.

In the above, applicants explored the idea of reducing the rate allocated to periodic tasks for the benefit of having smaller jitter. This tradeoff may be useful for mobile devices, where reduced jitter can be translated to reduced power consumption.

The model used in the above described embodiments of the present invention is the slotted time model, where all jobs have integer lengths and integer start times. In the unslotted model, job lengths, requested periods, start times (and hence granted periods as well) may be any positive real number. Thus the rounded algorithms above can be extended to the unslotted version.

Figure 5:
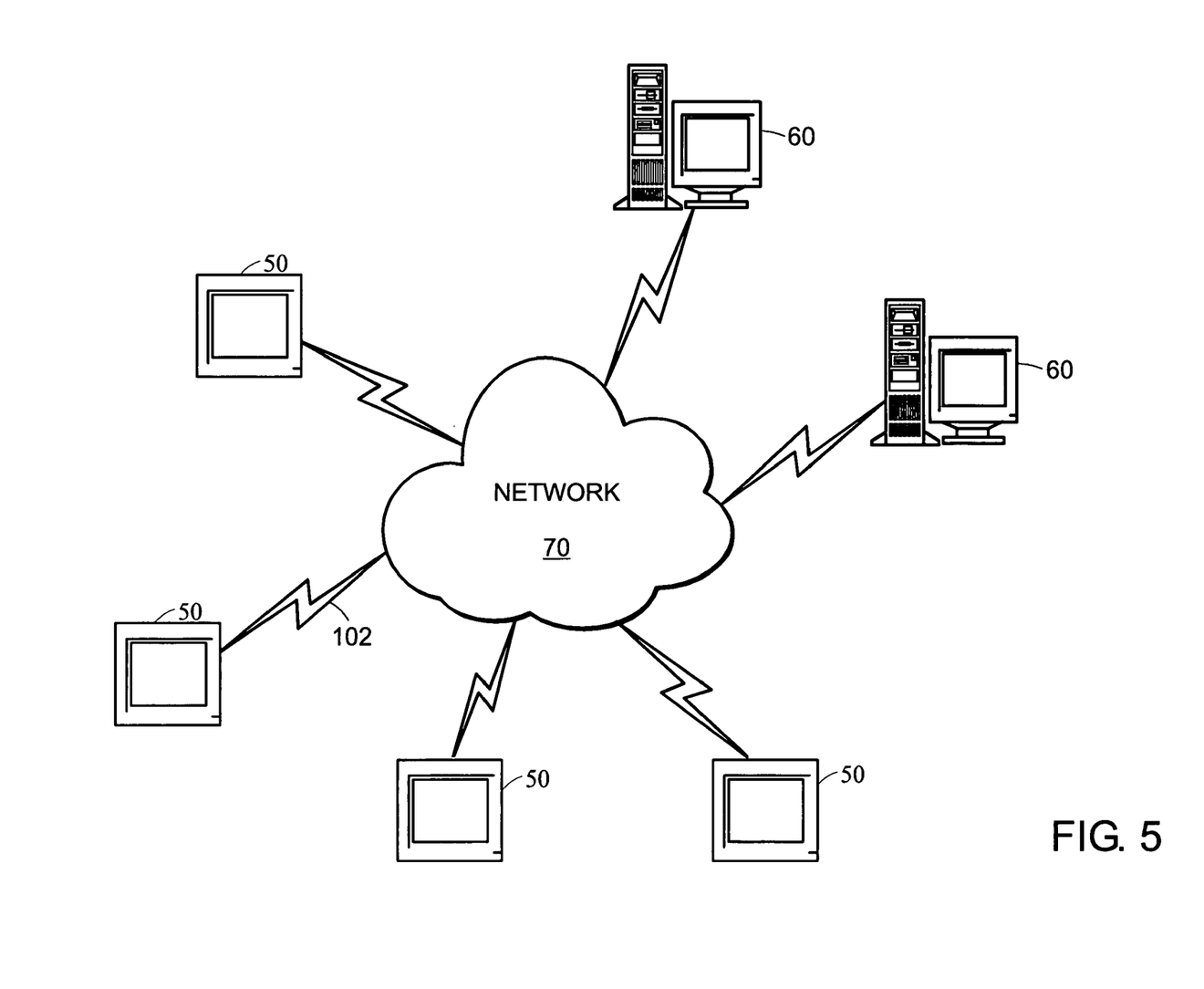
FIG. 5 is a schematic view of a mobile communications network in which embodiments of the present invention operate.

FIG. 5 illustrates a mobile device network or similar computer environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a mobile phone network, the Internet, a worldwide collection of computers, Local areas or Wide area networks, and gateways that currently use respective protocols (TCP/IP, Bluetooth, etc.) to communicate with one another. Other electronic device/computer/network architectures are suitable.

Figure 6:
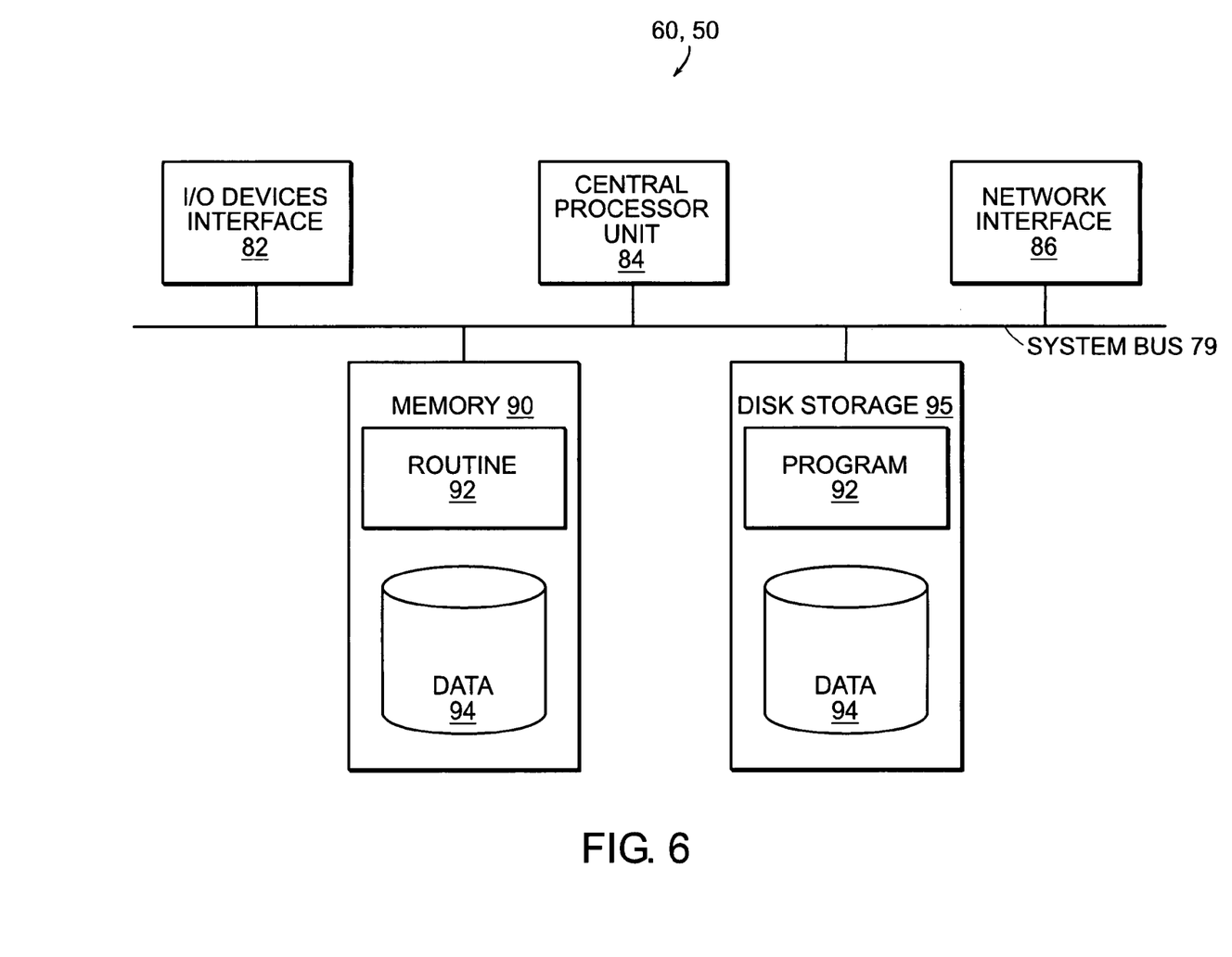
FIG. 6 is a block diagram of a processor in the network of FIG. 5.

FIG. 6 is a diagram of the internal structure of a computer (e.g., client processor/device 50 or server computers 60) in the computer system of FIG. 5. Each computer contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 5). Memory 90 provides volatile storage for computer software instructions used to implement an embodiment of the present invention (e.g., Program Routines 92 and Data 94, such as software programs/code/routines 10, 40 and sub-routine 20). Disk storage 95 provides non-volatile storage for computer software instructions and data used to implement an embodiment of the present invention. Central processor unit 84 is also attached to system bus 79 and provides for the execution of computer instructions.

In one embodiment, the programs and data are a computer program product 92, including a computer readable medium (e.g., a removable storage medium such as one or more DVD-ROM's, CD-ROM's, diskettes, tapes, etc.) that provides at least a portion of the software instructions for cont_bal routine 10, algorithm/routine 40 and split sub-routine 20. Computer program product 92 can be installed by any suitable software installation procedure, as is well known in the art. In another embodiment, at least a portion of the software instructions may also be downloaded over a wireless connection.

While this invention has been particularly shown and described with references to preferred embodiments thereof, it will be understood by those skilled in the art that various changes in form and details may be made therein without departing from the scope of the invention encompassed by the appended claims.

For example, various electronic devices and/or digital processing units may be the "clients" or jobs in the foregoing description of the present invention.

Instances and jobs:
J: an instance of the problem.
n: number of jobs (clients) in an instance.
$j_i$: the ith job in an instance.
$b_i$: length (execution time) of $j_i$.
$\tau_i$: requested period of $j_i$.

$$B_J \stackrel{def}{=} \max\{b_i \mid i \in J\}$$

$$T_J \stackrel{def}{=} \max\{\tau_i \mid i \in J\}$$

$$t_J \stackrel{def}{=} \min\{\tau_i \mid i \in J\}$$

$$R_J \stackrel{def}{=} \frac{B_J}{t_J}:$$

extent of instance J.

$$B_i \stackrel{def}{=} \frac{b_i}{\tau_i}:$$

requested bandwidth of $j_i$.

$$B_J \stackrel{def}{=} \sum_{i \in J} B_i:$$

total bandwidth of instance J.

Schedules and quality measures:
S: a schedule.
$\tau_i^S$: granted period of $j_i$ in schedule S.

$$\rho_i \stackrel{def}{=} \frac{\tau_i^S}{\tau_i}:$$

period of approximation of $j_i$ in schedule S.

$$\rho(J, S) \stackrel{def}{=} \max\{\rho_i \mid j_i \in J\}:$$

period approximation of S with respect to J.
$\sigma_i$: Jitter ratio of job i.

$$\sigma(S) \stackrel{def}{=} \max\{\sigma_i \mid j_i \in J\}:$$

Jitter ratio of S.

What is claimed is:
1. A method, executed by software on a computer-readable medium of a computer, of scheduling jobs each having respective (i) length of execution time and (ii) requested frequency of occurrence, comprising:

for each given job, allocating, by the computer, a respective set of start times in a cycle in a manner that evenly spreads the given jobs over the cycle;

adding, by the computer, idle time slots in the cycle in a manner which reduces jitter, such that there is a balance between period approximation and jitter reduction, wherein period approximation is computed based on a comparison of (1) a frequency of occurrence granted to each given job in the cycle, and (2) the requested frequency of occurrence of the given job in the cycle;

rounding up, by the computer, each requested frequency of occurrence to a next power of 2 before the steps of allocating and adding so as to generate a first schedule;

rounding, by the computer, each requested frequency to a respective closest power of 2 before the steps of allocating and adding such that a second schedule is generated; and selecting, by the computer, one of the first schedule and second schedule as a function of period approximation.

2. A method, executed by software on a computer-readable medium of a computer, of scheduling jobs each having respective (i) length of execution time and (ii) requested frequency of occurrence, comprising:

for each given job, allocating, by the computer, a respective set of start times in a cycle in a manner that evenly spreads the given jobs over the cycle; and adding, by the computer, idle time slots in the cycle in a manner which reduces jitter, such that there is a balance between period approximation and jitter reduction, wherein allocating the respective set of start times includes constructing a binary tree of 1+log (T/t) levels of nodes, said tree having leaves representing sub interval, of the cycle, where T is the greatest requested frequency of occurrence and t is the smallest requested frequency of occurrence of the given jobs.

3. The method of claim 2 wherein each node of the tree has two children nodes; and further comprising defining job replicas from respective given jobs, and populating children nodes and leaves with the defined job replicas.

4. The method of claim 3 wherein defining a job replica includes providing a job replica with a requested frequency which is double that of a corresponding given job.

5. The method of claim 2 wherein adding idle time slots includes padding nodes of the tree with dummy job replicas so that all nodes at a same level have the same length.

6. The method of claim 2 wherein the nodes of the binary tree hold jobs in order of the given jobs.

7. Computer apparatus for scheduling jobs each having respective (i) length of execution time and (ii) requested frequency of occurrence comprising:

an allocator that for each given job, is configured to allocate a respective set of start times in a cycle in a manner that evenly spreads the given jobs over the cycle, wherein the allocator is configured to further
  round up each requested frequency of occurrence to a next power of 2 before allocating sets of start times so as to generate a first schedule,
  round each requested frequency to a respective closest power of 2 before allocating sets of start times such that a second schedule is generated, and
  select one of the first schedule and second schedule depending on the schedule with relative optimal period approximation; and a padding member coupled to the allocator and configured to add idle time slots in the cycle in a manner which reduces differences in spacing between consecutive occurrences of the same job while optimizing period approximation, wherein period approximation is computed based on a comparison of (1) a frequency of occurrence granted to each given job in the cycle, and (2) the requested frequency of occurrence of the given job in the cycle.

8. Computer apparatus for scheduling jobs each having respective (i) length of execution time and (ii) requested frequency of occurrence comprising:

an allocator that for each given job, is configured to allocate a respective set of start times in a cycle in a manner that evenly spreads the given jobs over the cycle; and a padding member coupled to the allocator and configured to add idle time slots in the cycle in a manner which reduces differences in spacing between consecutive occurrences of the same job while optimizing period approximation, wherein the allocator is configured to employ a binary tree of 1+log (T/t) levels of nodes and whose leaves represent sub intervals of the cycle, where T is the greatest requested frequency of occurrence and t is the smallest requested frequency of occurrence of the given jobs.

9. The apparatus of claim 8 wherein each node of the tree has two children nodes; and the allocator is configured to further define job replicas from respective given jobs and populates children nodes and leaves with the defined job replicas.

10. The apparatus of claim 8 wherein the allocator is configured to further pad nodes of the tree with dummy job replicas so that all nodes of the same level have the same length.

11. A communication system between client devices and at least one server comprising:

communication means for enabling communication between servers and client device; and scheduling means coupled to the communications means for scheduling periodic client device communication sessions, wherein each of the client device communication sessions is associated with a requested frequency of occurrence within a cycle, said scheduling means including:
  allocation means for allocating for each given client device, a respective set of start times in the cycle in a manner that evenly spreads the given client device communication sessions over the cycle, and
  padding means for adding idle time slots in the cycle in a manner which reduces differences in spacing between consecutive sessions of the client device, said scheduling means for providing both jitter reduction and relatively increased period approximation, wherein the period approximation for each given client device communications session is computed based on a ratio of (1) a granted frequency of occurrence of the given client device communication session in the cycle, to (2) the requested frequency of occurrence of the given client device communication session in the cycle, wherein the scheduling means is for further:
  rounding up each requested number of client device sessions to a next power of 2 before allocating and adding so as to generate a first schedule;
  rounding each requested number of client device sessions to a respective closest power of 2 before allocating and adding such that a second schedule is generated: and
  selecting one of the first schedule and second schedule as a function of period approximation.

12. A communication system between client devices and at least one server comprising:
- communication means for enabling communication between servers and client devices; and
- scheduling means coupled to the communications means for scheduling periodic client device communication sessions, said scheduling means including:
  - allocation means for allocating, for each given client device, a respective set of start times in the cycle in a manner that evenly spreads the given client device communication sessions over the cycle, and
  - padding means for adding idle time slots in the cycle in a manner which reduces differences in spacing between consecutive sessions of the client device, said scheduling means for providing both jitter reduction and relatively increased period approximation,
- wherein the allocation means is for constructing a binary tree having $1+\log(T/t)$ levels of nodes and whose leaves represent sub intervals of the cycle, where T is the greatest requested number of sessions and t is the smallest requested number of sessions of the given client devices.

13. The system of claim 12 wherein each node of the tree has two children nodes; and
the allocation means is for further defining job replicas from given client devices and populates children nodes and leaves with the defined job replicas.

14. The system of claim 12 wherein the padding means is for padding nodes of the tree with dummy job replicas so that all nodes at a same level have the same length.

15. The system of claim 12 wherein the nodes of the binary tree hold jobs in order of the given client devices.

16. A computer-readable medium storing computer readable code for controlling processor to carry out the steps for periodic scheduling comprising:
- for each given job, allocating a respective set of start times in a cycle in a manner that evenly spreads the given jobs over the cycle;
- adding idle time slots in the cycle in a manner which reduces the differences in spacing between consecutive occurrences of the same job; and
- to perform the allocating and adding, building a tree having nodes at plural levels, wherein the nodes are associated with corresponding groups of the given jobs, and wherein the tree has a number of levels defined based on a greatest requested frequency of occurrence of the given jobs in the cycle, and a smallest requested frequency of occurrence of the given jobs in the cycle,
- wherein the computer-readable code is to further control the processor to carry out the steps of:
- rounding up each requested period to a next power of 2 before the steps of allocating and adding so as to generate a first schedule;
- rounding each requested period to a respective closest power of 2 before the steps of allocating and adding such that a second schedule is generated; and
- selecting one of the first schedule and second schedule as a function of relative optimal period approximation.

17. The method of claim 1, wherein the comparison of (1) the frequency of occurrence granted to each given job in the cycle, and (2) the requested frequency of occurrence of the given job in the cycle is according to a ratio of (1) the frequency of occurrence granted to each given job in the cycle, to (2) the requested frequency of occurrence of the given job in the cycle.

* * * * *

UNITED STATES PATENT AND TRADEMARK OFFICE
CERTIFICATE OF CORRECTION

| | | |
|---|---|---|
| PATENT NO. | : 7,586,892 B2 | Page 1 of 1 |
| APPLICATION NO. | : 10/832487 | |
| DATED | : September 8, 2009 | |
| INVENTOR(S) | : Boaz Patt-Shamir et al. | |

It is certified that error appears in the above-identified patent and that said Letters Patent is hereby corrected as shown below:

In column 15, line 32, in Claim 2, delete "interval," and insert -- intervals --, therefor.

In column 15, line 48, in Claim 6, after "in" insert -- ≺ --.

In column 16, line 35, in Claim 11, delete "device;" and insert -- devices; --, therefor.

In column 16, line 42, in Claim 11, after "allocating" insert -- , --.

In column 17, line 31, in Claim 15, after "in" insert -- ≺ --.

In column 17, line 33, in Claim 16, after "controlling" insert -- a --.

Signed and Sealed this

Twentieth Day of April, 2010

David J. Kappos
*Director of the United States Patent and Trademark Office*